United States Patent
Qu

(10) Patent No.: US 9,973,411 B2
(45) Date of Patent: May 15, 2018

(54) SYNCHRONIZATION OF DATA AND CONTROL PLANES OF ROUTERS

(71) Applicant: Nicira, Inc., Palo Alto, CA (US)

(72) Inventor: Hongya Qu, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 96 days.

(21) Appl. No.: 15/076,491

(22) Filed: Mar. 21, 2016

(65) Prior Publication Data

US 2017/0272192 A1 Sep. 21, 2017

(51) Int. Cl.
*H04J 3/06* (2006.01)
*H04L 12/701* (2013.01)

(52) U.S. Cl.
CPC .................. *H04L 45/00* (2013.01)

(58) Field of Classification Search
CPC .................................................. H04J 3/0697
See application file for complete search history.

(56) References Cited

U.S. PATENT DOCUMENTS

| | | | | |
|---|---|---|---|---|
| 7,606,140 B2* | 10/2009 | Golla | ...................... | H04L 45/02 370/216 |
| 2007/0217420 A1* | 9/2007 | Raj | ......................... | H04L 45/00 370/392 |
| 2014/0003227 A1* | 1/2014 | Scudder | ................. | H04L 45/021 370/218 |
| 2015/0078381 A1* | 3/2015 | Willis | ..................... | H04L 45/02 370/392 |
| 2015/0117459 A1* | 4/2015 | Liu | ........................ | H04L 45/742 370/392 |
| 2015/0341310 A1* | 11/2015 | You | ...................... | H04L 61/3025 709/245 |
| 2016/0014028 A1* | 1/2016 | He | ......................... | H04L 45/745 370/392 |
| 2016/0191374 A1* | 6/2016 | Singh | ...................... | H04L 41/00 370/228 |
| 2016/0261501 A1* | 9/2016 | Hegde | ..................... | H04L 45/22 |
| 2016/0352866 A1* | 12/2016 | Gupta | ..................... | H04L 67/42 |

* cited by examiner

*Primary Examiner* — Brian D Nguyen

(57) ABSTRACT

Synchronization between a data plane of a router in a network and a control plane of the router is performed by a processor of the router. Route information associated with at least one network node in the network is learned using a routing protocol. The route information includes a plurality of subsets and is stored in a routing information base (RIB) of the router. A first subset of the plurality of subsets of the route information is copied from the RIB to a forwarding information base (FIB) of the router. After the first subset has been copied to the FIB, synchronization data in the router associated with the first subset is modified. The modification indicates that the first subset has been copied to the FIB.

20 Claims, 3 Drawing Sheets

SYNCHRONIZATION OF DATA AND CONTROL PLANES OF ROUTERS

BACKGROUND

At least some known modern communication networks can include numerous network nodes, such as routers and switches, for forwarding data packets. Routing protocols, such as Border Gateway Protocol (BGP) and Open Shortest Path First (OSPF), can be used between network nodes to populate subnets. At least some known modern routers and switches support the separation of the control plane and the data plane. The control plane aspect of a router performs setup and configuration functions, e.g., using a routing protocol, to learn the topology of the network and to inform other network nodes about route accessibility. The control plane involves communicating with other nodes to form a map of the network so that data packets can then be routed accurately and efficiently. The data plane, also known as the forwarding plane or user plane, leverages information gleaned from the control plane, so that incoming data packets can be processed appropriately. For example, data packets that arrive at one router may be forwarded to another router, queued for subsequent forwarding, or dropped (in the case of severe network congestion, for example). Because of the dependence of the data plane upon information associated with the control plane, problems such as data loss can arise if the data plane and control plane of a router are not synchronized with respect to each other.

SUMMARY

In some embodiments of the present disclosure, a method for synchronizing a data plane of a router in a network with a control plane of the router is performed by a processor of the router. The method generally includes learning route information associated with at least one network node in the network, using a routing protocol, wherein the route information includes a plurality of subsets. The route information is stored in a routing information base (RIB) of the router. A first subset of the plurality of subsets of the route information is copied from the RIB to a forwarding information base (FIB) of the router. After the first subset has been copied to the FIB, synchronization data in the router associated with the first subset is modified, wherein the modification indicates that the first subset has been copied to the FIB.

In some embodiments, a computer-readable storage medium has computer-executable instructions embodied thereon. When executed by at least one processor of a router in a network, the computer-executable instructions cause the at least one processor to perform operations described above regarding the method for synchronizing the data plane and control plane of the router.

In some embodiments, a router for routing data through a network includes at least one processor, at least one memory, and a computer-readable storage medium having computer-executable instructions embodied thereon. When executed by the at least one processor, the computer-executable instructions cause the at least one processor to perform operations described above regarding the method for synchronizing the data plane and control plane of the router.

DETAILED DESCRIPTION

Figure 1:
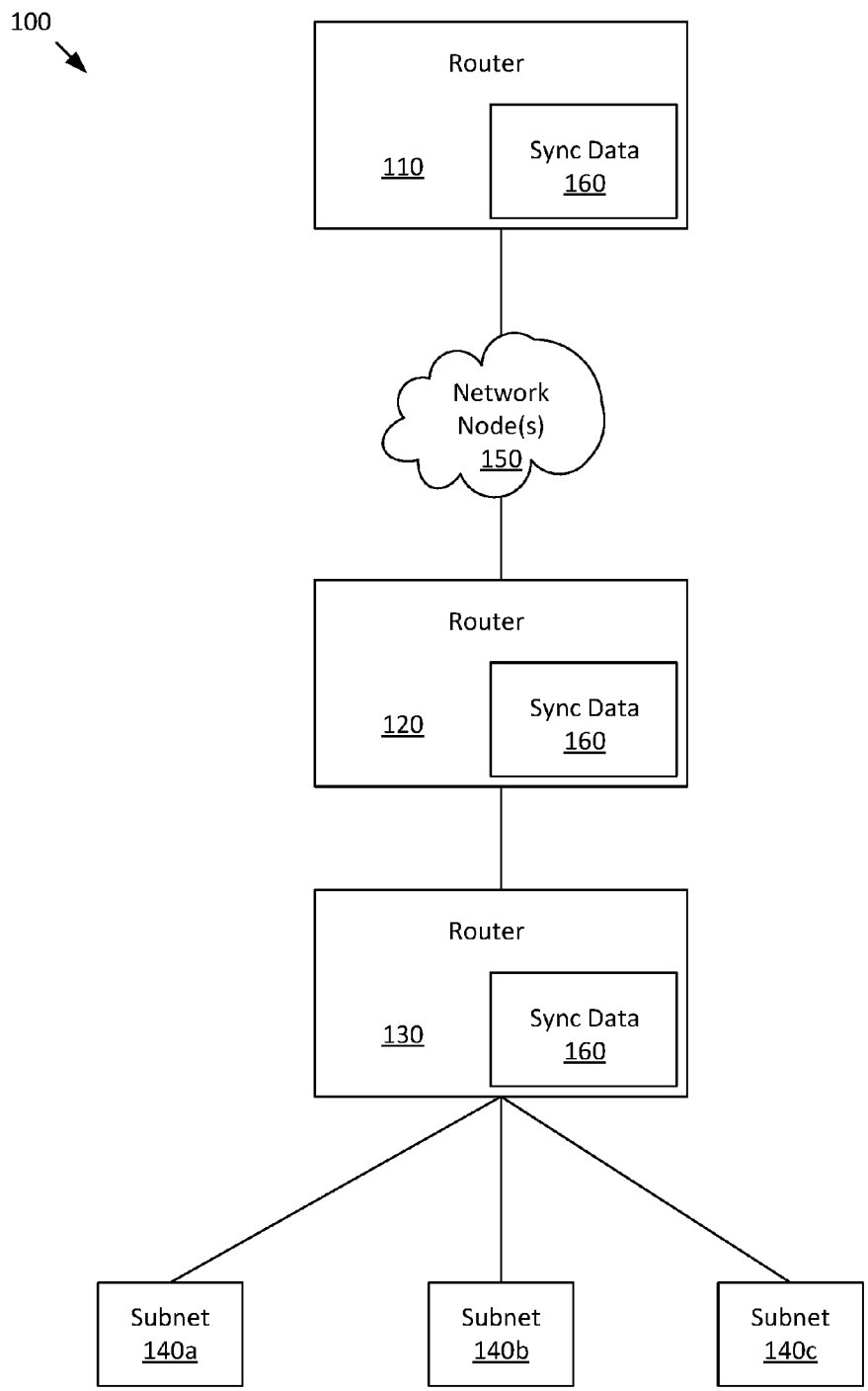
FIG. 1 is a network diagram in accordance with embodiments of the present disclosure.

FIG. 1 is an exemplary network diagram of a network 100 in which routers 110, 120, 130 are equipped to handle a scenario in which a router's data plane is not synchronized with its control plane. For example, in some scenarios, router 120 can learn route information for accessing subnets 140a, 140b, 140c (collectively, "subnets 140") advertised by a router 130 via a routing protocol, such as BGP. Router 120 then advertises to router 110 the route information that it has learned regarding subnets 140. One or more network nodes 150 may be situated between router 110 and 120. In a known scenario, upon learning the route information for subnets 140, router 110 commences by sending to router 120 data packets destined for subnets 140. If the control and data planes at router 120 are not synchronized with respect to the route information for subnets 140, data loss can occur. For example, router 120 may not have finished programming into its hardware forwarding table (referred to as forwarding information base or FIB) route information for subnet 140a that is learned via the routing protocol. In such a case, router 120 may not know how to handle an incoming packet destined for subnet 140a. The incoming packet may be dropped, a situation referred to as data blackholing. In other words, premature route advertisement causes the data plane to be attempted for routing to a given destination before the control plane has finished teaching router 120 how to actually route to that destination.

As described below in more detail below with respect to FIGS. 2 and 3, embodiments of the present disclosure address the potential problem of data blackholing by including and using synchronization data 160 at routers 110, 120, and 130 (in general, at any router in the network). Synchronization data 160 provides a mechanism for synchronizing the data and control planes of each router with respect to a given destination, such that packets will not be dropped because of premature advertisement of learned route information. Synchronization data 160 at each router ensures that whenever a packet arrives at any router, the control plane has already configured that router to be able to route that packet correctly.

Figure 2:
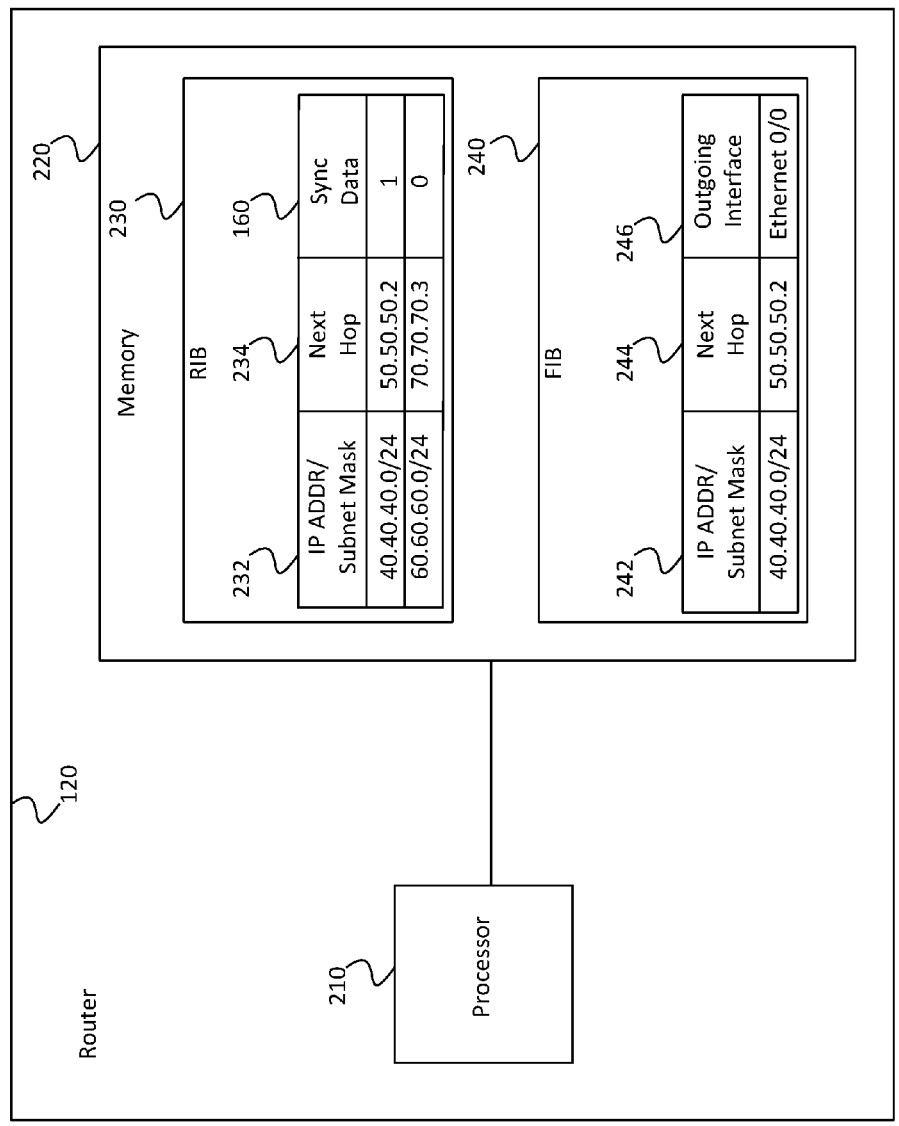
FIG. 2 is a block diagram of a router in accordance with some embodiments, showing an example implementation of synchronization data.

Referring to FIG. 2, router 120 in accordance with embodiments of the present disclosure includes one or more processors 210 and one or more memories 220 comprising a routing information base (RIB) 230 and a forwarding information base (FIB) 240. Although FIG. 2 depicts contents of router 120, FIG. 2 is equally applicable to routers 110, 130, and any other routers that may be used (e.g., any routers present at the one or more network nodes 150). Route information learned through a routing protocol as part of the control plane aspect of router 120 is stored in RIB 230. RIB 230 is a data table that lists the routes to various destinations on the network (network nodes other than router 120), and the table may include fields (depicted as columns in FIG. 2), such as an IP address/subnet mask field 232, next hop field 234, and synchronization data 160. Each row entry in RIB 230 corresponds to a respective destination accessible from router 120 (or in general, the router containing the RIB) and may be referred to as a route entry. For example, the first route entry in FIB 230 has 40.40.40.0/24 stored for the IP address/mask, and the next hop along the route is 50.50.50.2. Additional fields beyond the ones shown in FIG. 2 may be present in RIB 230 for each route entry.

Data corresponding to respective rows of RIB 230, other than synchronization data field 160, are copied to (programmed into) FIB 240. FIB 240 may have an IP address/subnet mark field 242, a next hop field 244, and additional fields, such as outgoing interface 246. In some embodiments, the one or more memories 220 comprising RIB 230 and FIB 240 include two or memories, with one memory (e.g., of a first memory type) comprising RIB 230 and another memory (e.g., of a second memory type) comprising FIB 240. For example, RIB 230 may be stored in central CPU memory, and FIB 240 may be stored in LAN card memory. In that case, programming the contents of respective rows of RIB 230 (apart from synchronization data field 160) into FIB enables proper hardware-level processing of incoming packets. In other embodiments, the one or more memories 220 in which RIB 230 and FIB 240 are situated include two memories of the same type storing RIB 230 and FIB 240, respectively, or a single memory storing RIB 230 and FIB 240. Even if a single memory is used within router 120, FIB 240 may have additional fields compared to RIB 230 (e.g., outgoing interface field 246 as shown in FIG. 2, or a "next hop MAC address" field which is not shown) to account for hardware details. As such, the route information stored in RIB 230 is copied into FIB 240 to enable the latter to be configured properly for data packet forwarding.

FIG. 2 illustrates that a first subset of the route information stored at RIB 230, including IP address/subnet mask field 232 and next hop field 234 for the first route entry (first row), has been copied into FIB 240. The outgoing interface field 246 has also been populated for that route entry in FIB 240 with value "Ethernet 0/0." To indicate that this first subset of the route information has been successfully copied from RIB 230 to FIB 240, synchronization data 160 is modified, e.g., by modifying synchronization data 160 from a first predetermined value to a second predetermined value. For example, synchronization data 160 may include a bitflag at each row of FIB 230, with the bitflag being set to a first predetermined value (e.g., 0) when the route entry is initially written into RIB 230 and the bitflag being subsequently modified to a second predetermined value (e.g., 1) to indicate that route information associated with that row (the first subset of the route information, as described above) has been successfully copied to FIB 240. Using a bitflag to represent synchronization state in this way is efficient and constitutes a minimal amount of additional storage. Other values than 0 and 1 may be used, and synchronization data 160 may include data of any type (e.g., other than a bitflag) that enables two different states (an unsynchronized state and a synchronized state) to be represented. For example, synchronization data 160 may include data occupying multiple bits (e.g., a data type such as an integer).

Figure 3:
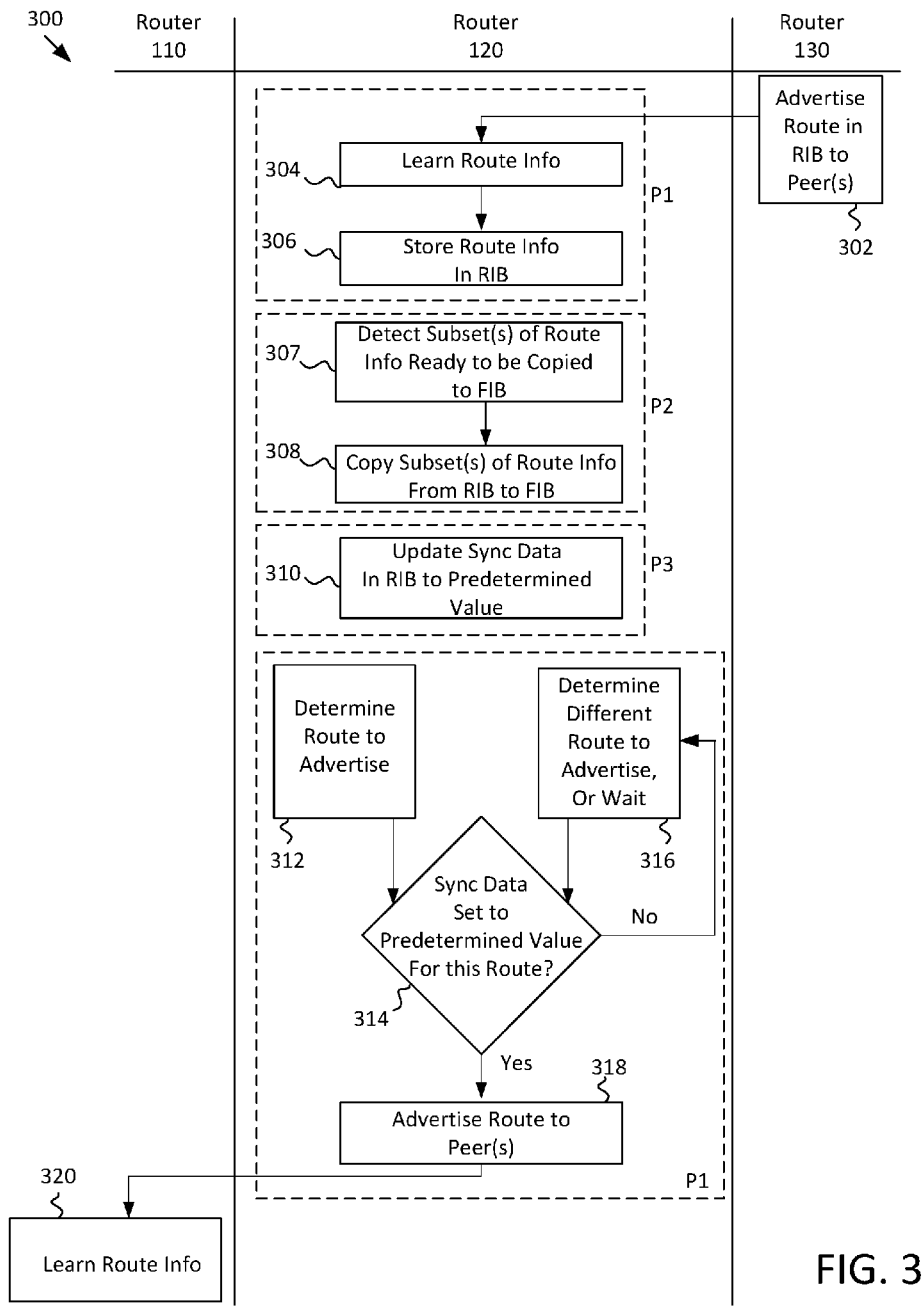
FIG. 3 is a swimlane diagram of an exemplary method for synchronizing the data plane and control plane of a router in accordance with some embodiments.

FIG. 3 is a swimlane diagram 300 of an exemplary method for synchronizing the data plane and control plane of router 120. This method may be embodied within a plurality of computer-executable instructions stored in one or more memories, such as one or more computer-readable storage media which may be within the one or more memories 220 (shown in FIG. 2) or elsewhere in router 120 (shown in FIGS. 1 and 2). Computer-readable storage media may include non-transitory storage media such as volatile and nonvolatile random access memory, removable and non-removable media implemented in any method or technology for storage of information such as computer-readable instructions embodied tangibly on the one or more non-transitory storage media, data structures, program modules or other data. The instructions are executed by one or more processors 210 (shown in FIG. 2) to perform the functions described herein.

At operation 302, router 130 advertises a destination on the network (or equivalently, a route to that destination via router 130) to router 120, which is a peer node. At operation 304, router 120 uses a routing protocol to learn route information advertised by router 130. At operation 306, router 120 stores the learned route information in RIB 230, e.g., as a plurality of route entries each including fields, such as IP address/subnet mask field 232 and next hop field 234. Thus, the route information learned by the routing protocol includes a plurality of subsets (or portions) of the route information, wherein each subset corresponds to a particular destination (equivalently, a particular route to that destination), i.e., a particular row of RIB 230. For example, referring back to FIG. 2, the route information at RIB 230 may include a first subset comprising IP address/subnet mask 232=40.40.40.0/24 and next hop 234=50.50.50.2 and a second subset comprising IP address/subnet mask 232=60.60.60.0/24 and next hop=70.70.70.3. Operations 304 and 306 may be performed by processor(s) 210 in a first process P1.

At operation 307, the existence of any subsets of the route information ready to be copied into FIB 240 is detected. In one embodiment, each time a newly learned route entry is written to RIB 230, the corresponding synchronization data 160 is set to a first state or value (e.g., 0), and RIB 230 is polled for the existence of any route entries having that first state or value for the synchronization data 160. In another embodiment, each time a newly learned route entry is written to RIB 230 in process P1, a signal is sent to process P2 to indicate the existence of the new subset of route information that is ready to be copied to FIB 240. The detected ready-to-be-copied subset(s) of the route information is copied from RIB 230 to FIB 240 at operation 308. In contrast, any subset of the route information having synchronization data 160 set to a second state or value (e.g., 1) does not need to be copied to FIB 240 because the second state or value indicates that such a route entry has already been copied to FIB 240. Operations 307 and 308 may be performed by processor(s) 210 in a second process P2.

In some embodiments, a separate process P3 is used to modify synchronization data 160 associated with a particular subset of the route information to the second state or value (e.g., 1) after the copying of that subset to FIB 240 (operation 308) has completed. Using a separate process P3 for this purpose can promote efficiency and speed, e.g., in a multi-processor implementation where a separate processor can be assigned to process P3. Process P3 may periodically scan RIB 230 and FIB 240 to update synchronization data 160 as appropriate (i.e., when respective copying operations have completed).

Process P3 may act as a service to any routing protocol. From the point of view of the routing protocol, behavior relative to peer nodes remains essentially the same as with traditional approaches, but a check for the synchronized state (i.e., synchronization between the data and control planes for the relevant destination node) is implemented to avoid premature route advertisement. For example, at operation 312, router 120 determines a route (to a destination node accessible via router 120) to advertise to a peer node. Instead of immediately advertising that that subset of the route information stored at RIB 230, as in known approaches (which might result in data blackholing), a check operation 314 is first performed to determine whether synchronization data 160 has a value indicating the synchronized state for that subset. If synchronization is detected, then that subset is advertised to peer(s) (e.g., to router 110 as shown in FIG. 3) at operation 318. For example, if synchronization data 160 associated with that subset has the value 1, indicating that the subset of route information corresponding to that synchronization data 160 has been successfully copied into FIB 240, then that subset is advertised to peer(s), such as to router 110.

On the other hand, if lack of synchronization is detected, a condition that may cause data blackholing with known approaches, then, in one embodiment, an alternate route (alternate subset of the route information) is selected at operation 316 for advertising. Check operation 314 is then performed for that alternate route. In another embodiment, at operation 316, a delay (e.g., for a fixed or variable delay interval) is implemented, and after the delay interval has elapsed, check operation 314 is again performed for the same route. Operations 312, 314, 316, and 318 may be performed in process P1.

At operation 320, router 110 learns route information in a manner similar to operation 304. In this manner, route information is propagated through the network, consistent with the control plane's role of preparing respective routers for data forwarding associated with the data plane.

Thus, in embodiments of the present disclosure, advertisement of a given subset of route information occurs after that subset has been successfully copied into (stored in) FIB 240. Because router 320 learns a subset of route information advertised by router 120 (operation 320) after that subset of route information was fully copied into FIB 240 of router 120, router 110 is unable to send a data packet destined for subnet 140*a* (referring back to FIG. 1) to router 120 along the data plane before router 120 is configured to handle the data packet. Thus, various embodiments of the present disclosure enable incoming data packets arriving at router 120 destined for a given destination to be matched to a corresponding row in FIB 240 and forwarded appropriately (i.e., based on the next hop field 244 for that row). Hence, the problem of data loss encountered with known routing approaches is addressed, and efficiency and accuracy in routing are enhanced with limited resource overhead.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for synchronizing a data plane of a router in a network with a control plane of the router, wherein the method is performed by a processor of the router, the method comprising:
    learning route information associated with at least one network node in the network, using a routing protocol, wherein the route information includes a plurality of subsets;
    storing the route information in a routing information base (RIB) of the router;
        copying a first subset of the plurality of subsets of the route information from the RIB to a forwarding information base (FIB) of the router; and
        modifying synchronization data in the router associated with the first subset after the first subset has been copied to the FIB, wherein the modification indicates that the first subset has been copied to the FIB.

2. The method of claim 1, further comprising advertising the first subset to at least one peer node in the network based on a determination that the synchronization data indicates that the first subset has been copied to the FIB.

3. The method of claim 2, further comprising:
    determining, based on synchronization data in the router associated with a second subset of the plurality of subsets, that the second subset has not been copied from the RIB to the FIB.

4. The method of claim 3, further comprising:
   determining, based on synchronization data in the router associated with a third subset of the plurality of subsets, that the third subset has been copied from the RIB to the FIB; and
   advertising the third subset to said at least one peer node based on said determining that the third subset has been copied from the RIB to the FIB, without advertising the second subset.
5. The method of claim 3, further comprising:
   delaying by a delay interval; and
   after the delay interval, checking the synchronization data in the router associated with the second subset.
6. The method of claim 5, wherein said checking indicates that the second subset has been copied from the RIB to the FIB, the method further comprising:
   advertising the second subset to said at least one peer node based on the indication that the second subset has been copied from the RIB to the FIB.
7. The method of claim 1, wherein:
   the synchronization data associated with the first subset comprises a bitflag;
   said storing the route information in the RIB includes setting the bitflag for the first subset to a first value; and
   said modifying the synchronization data associated with the first subset includes setting the bitflag to a second value.
8. The method of claim 1, wherein:
   said learning and said storing are performed by the processor in a first process;
   said copying is performed by the processor in a second process; and
   said modifying is performed by the processor in a third process.
9. A non-transitory computer-readable storage medium having computer-executable instructions embodied thereon, wherein, when executed by at least one processor of a router in a network, the computer-executable instructions cause the at least one processor to:
   learn route information associated with at least one network node in the network, using a routing protocol, wherein the route information includes a plurality of subsets;
   store the route information in a routing information base (RIB) of the router;
   copy a first subset of the plurality of subsets of the route information from the RIB to a forwarding information base (FIB) of the router; and
   modify synchronization data in the router associated with the first subset after the first subset has been copied to the FIB, wherein the modification indicates that the first subset has been copied to the FIB.
10. The non-transitory computer-readable storage medium of claim 9, wherein the computer-executable instructions, when executed, further cause the at least one processor to advertise the first subset to at least one peer node in the network based on a determination that the synchronization data indicates that the first subset has been copied to the FIB.
11. The non-transitory computer-readable storage medium of claim 10, wherein the computer-executable instructions, when executed, further cause the at least one processor to determine, based on synchronization data in the router associated with a second subset of the plurality of subsets, that the second subset has not been copied from the RIB to the FIB.
12. The non-transitory computer-readable storage medium of claim 11, wherein the computer-executable instructions, when executed, further cause the at least one processor to:
   determine, based on synchronization data in the router associated with a third subset of the plurality of subsets, that the third subset has been copied from the RIB to the FIB; and
   advertise the third subset to said at least one peer node based on said determining that the third subset has been copied from the RIB to the FIB, without advertising the second subset.
13. The non-transitory computer-readable storage medium of claim 12, wherein the computer-executable instructions, when executed, further cause the at least one processor to:
   delay by a delay interval; and
   after the delay interval, check the synchronization data in the router associated with the second subset.
14. The non-transitory computer-readable storage medium of claim 13, wherein the check of the synchronization data in the router associated with the second subset indicates that the second subset has been copied from the RIB to the FIB, and the computer-executable instructions, when executed, further cause the at least one processor to:
   advertise the second subset to said at least one peer node based on the indication that the second subset has been copied from the RIB to the FIB.
15. The non-transitory computer-readable storage medium of claim 9, wherein:
   the synchronization data associated with the first subset comprises a bitflag;
   the computer-executable instructions, when executed, cause the at least one processor to store the route information in the RIB by setting the bitflag for the first subset to a first value; and
   the computer-executable instructions, when executed, cause the at least one processor to modify the synchronization data associated with the first subset by setting the bitflag to a second value.
16. The non-transitory computer-readable storage medium of claim 9, wherein the computer-executable instructions, when executed, cause the at least one processor to:
   learn the route information and store the route information in the RIB in a first process;
   copy the first subset of the route information from the RIB to the FIB in a second process; and
   modify the synchronization data associated with the first subset in a third process.
17. A router for routing data through a network, the router comprising:
   at least one processor;
   at least one memory; and
   a computer-readable storage medium having computer-executable instructions embodied thereon, wherein, when executed by the at least one processor, the computer-executable instructions cause the at least one processor to:
   learn route information associated with at least one network node in the network, using a routing protocol, wherein the route information includes a plurality of subsets;
   store the route information in a routing information base (RIB) in the at least one memory;

copy a first subset of the plurality of subsets of the route information from the RIB to a forwarding information base (FIB) in the at least one memory; and modify synchronization data in the router associated with the first subset after the first subset of the route information has been copied to the FIB, wherein the modification indicates that the first subset has been copied to the FIB.

18. The router of claim 17, wherein the computer-executable instructions, when executed, further cause the at least one processor to advertise the first subset to at least one peer node in the network based on a determination that the synchronization data that the first subset has been copied to the FIB.

19. The router of claim 17, wherein:

the synchronization data associated with the first subset comprises a bitflag;

the computer-executable instructions, when executed, cause the at least one processor to store the route information in the RIB by setting the bitflag for the first subset to a first value; and the computer-executable instructions, when executed, cause the at least one processor to modify the synchronization data associated with the first subset by setting the bitflag to a second value.

20. The router of claim 17, wherein the computer-executable instructions, when executed, cause the at least one processor to:

learn the route information and store the route information in the RIB in a first process;

copy the first subset of the route information from the RIB to the FIB in a second process; and modify the synchronization data associated with the first subset in a third process.

* * * * *